US008239449B2

(12) United States Patent
Adiraju et al.

(10) Patent No.: US 8,239,449 B2
(45) Date of Patent: Aug. 7, 2012

(54) TRANSMISSION PROTOCOL FOR A GAMING SYSTEM

(75) Inventors: Srinivyasa M. Adiraju, Vernon Hills, IL (US); Dale R. Buchholz, Palatine, IL (US)

(73) Assignee: WMS Gaming Inc., Waukegan, IL (US)

( * ) Notice: Subject to any disclaimer, the term of this patent is extended or adjusted under 35 U.S.C. 154(b) by 1142 days.

(21) Appl. No.: 11/996,039

(22) PCT Filed: Jul. 20, 2006

(86) PCT No.: PCT/US2006/028217

§ 371 (c)(1), (2), (4) Date: Jan. 17, 2008

(87) PCT Pub. No.: WO2007/012034

PCT Pub. Date: Jan. 25, 2007

(65) Prior Publication Data

US 2008/0248876 A1 Oct. 9, 2008

Related U.S. Application Data

(60) Provisional application No. 60/701,195, filed on Jul. 20, 2005.

(51) Int. Cl.
*G06F 15/00* (2006.01)
*A63F 13/00* (2006.01)

(52) U.S. Cl. .......... 709/203; 709/220; 709/227; 463/17; 463/25

(58) Field of Classification Search .................... 463/25, 463/17; 709/203, 220, 227
See application file for complete search history.

(56) References Cited

U.S. PATENT DOCUMENTS

| | | | | |
|---|---|---|---|---|
| 6,033,306 | A * | 3/2000 | De Souza | 463/18 |
| 6,527,638 | B1 * | 3/2003 | Walker et al. | 463/25 |
| 7,452,270 | B2 * | 11/2008 | Walker et al. | 463/17 |
| 7,779,154 | B2 * | 8/2010 | Lipsanen et al. | 709/239 |
| 2004/0204234 | A1 * | 10/2004 | Walker et al. | 463/25 |
| 2005/0043020 | A1 * | 2/2005 | Lipsanen et al. | 455/422.1 |

OTHER PUBLICATIONS

"Gaming Standards Association", Document ID; gsa-p0050.004.04, <http://www.gamingstandards.com>,(May 28, 2005), 1-56.
"International Search Report for Application No. PCT/US2006/28217 date mailed Sep. 18, 2007", 5 pgs.
"Written Opinion of the International Searching Authority for Application No. PCT/US2006/28217, date mailed Sep. 18, 2007", 6 pgs.

* cited by examiner

*Primary Examiner* — Khanh Dinh
(74) *Attorney, Agent, or Firm* — Schwegman, Lundberg & Woessner, P.A.

(57) ABSTRACT

Systems and methods use a reliable connection oriented protocol to send and receive messages (i.e. datagrams) between gaming applications and gaming services. In one aspect, the protocol is the SCTP protocol.

28 Claims, 7 Drawing Sheets

TRANSMISSION PROTOCOL FOR A GAMING SYSTEM

RELATED APPLICATIONS

This application is a U.S. National Stage Filing under 35 U.S.C. 371 from International Patent Application Serial No. PCT/US2006/028217, filed Jul. 20, 2006, and published on Jan. 25, 2007 as WO 2007/012034 A2 and republished as WO 2007/012034 A3, which claims the priority benefit of U.S. Provisional Application Ser. No. 60/701,195 filed Jul. 20, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

BACKGROUND

Gaming machines may be operated as a stand alone unit, or linked in a network of some type to a group of gaming machines. As technology in the gaming industry progresses, more and more gaming services are being provided to gaming machines via communication networks that link groups of gaming machines to one another and to remote central server computers that provide one or more gaming services. As an example, gaming services that may be provided by the remote computer to a gaming machine via a communication network of some type include player tracking, accounting, cashless award ticketing, lottery, progressive games and bonus games. In addition, gaming machines are evolving into gaming platforms where the gaming services and game play options provided on the gaming machines may be dynamically configured. Thus, the number and type of game services and game play options offered on a particular gaming machine may vary with time.

A gaming entity may operate hundreds, thousands or tens of thousands of gaming machines. Since gaming is allowed in many locations throughout the world, casinos may have games distributed over a wide geographic area. Within casinos, the gaming machines may be connected via one or more dedicated networks. Servers are usually located in a back-room of the casino away from the casino floor.

Networked gaming systems typically communicate with one another using either TCP/IP (Transmission Control Protocol/Internet Protocol) or UDP/IP (User Datagram Protocol/Internet Protocol), which are both well known and widely available protocols.

Several issues however are associated with the use of TCP/IP or UDP/IP. TCP/IP is a byte-stream oriented protocol in which bytes are delivered to a receiver in the order sent by the sender. The byte order is guaranteed regardless of the order in which network packets containing the byte-stream arrive. In addition, TCP/IP is a considered a "reliable" protocol, meaning that if a byte is sent, it is guaranteed to be delivered to the receiver (barring catastrophic network or system failure). Thus if a sender or receiver detects that a part of the byte-stream has not been delivered, the packet or packets containing the missing bytes are retransmitted.

While guaranteed delivery is desirable, the mechanism used in TCP/IP to achieve it has led to the "head of queue" blocking problem. In TCP/IP a queue is typically maintained of bytes waiting to be delivered to the intended receiver application. Due to network or system failures, one or more packets may be dropped, while subsequent packets are delivered. In TCP/IP, delivery halts until the bytes at the head of the queue are retransmitted, which can lead to sizable delays in delivering the remaining bytes.

A further issue with TCP/IP is related to the byte-stream nature of the protocol. Gaming applications and services that communicate with one another often do so using messages having particular messages sizes or message boundaries. Because TCP/IP is a byte-stream oriented protocol, it is up to the gaming applications and services to provide code that organizes the byte stream into messages, thus adding complexity to developing the gaming applications and services.

UDP/IP is able to address the message oriented needs of gaming applications and services because UDP organizes and delivers data in "datagrams", which may comprise a message. Further, the datagrams, are delivered in the order they arrive, which may or may not be the order they are sent. As a result, UDP/IP does not exhibit the head of queue blocking problem seen in TCP/IP. However, delivery is not guaranteed in UDP/IP, if a packet is dropped, no retransmission is attempted. Thus if a gaming application and service desires to use messages in datagrams to reliably exchange data, the applications and services must supply a mechanism on top of UDP/IP to provide for retransmission of lost messages, thus adding complexity and expense in developing the gaming applications and services.

Additionally, TCP/IP and UDP/IP are not considered fault tolerant. A network or system failure along a network path connecting gaming applications with services can lead to the complete disruption in the delivery of data. In order to achieve fault tolerance, additional layers of code must be provided by the gaming application or service developer, leading to additional cost and complexity.

SUMMARY

The above-mentioned shortcomings, disadvantages and problems are addressed by the present invention, which will be understood by reading and studying the following specification.

Systems and methods use a reliable connection oriented protocol to send and receive messages (i.e. datagrams) between gaming applications and gaming services. In one aspect, the protocol is the SCTP protocol.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
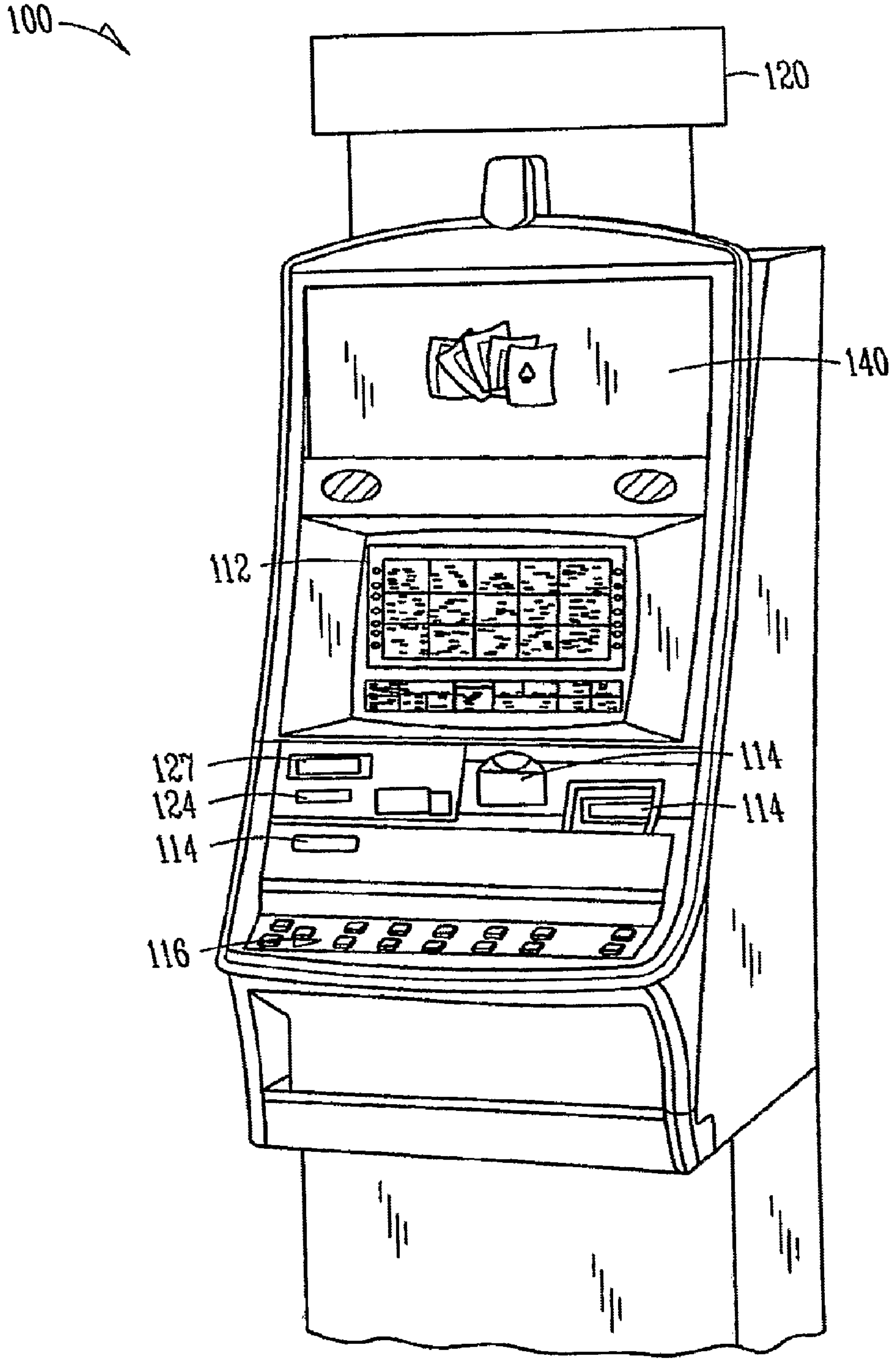
FIG. 1 is a perspective view of a gaming machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as “processing” or “computing” or “calculating” or “determining” or “displaying” or the like, refer to the action and processes of a computer system, or similar computing device, that manipulates and transforms data represented as physical (e.g., electronic) quantities within the computer system’s registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 illustrates an example gaming machine 100 in which may be included various embodiments of the invention. In some embodiments, gaming machine 100 is operable to conduct a wagering game. These wagering games may include reel based wagering games such as mechanical or video slots, card based games such as video poker, or other types of wagering games such as video keno, video bingo or a video dice game. If based in video, the gaming machine 100 includes a video display 112 such as a cathode ray tube (CRT), liquid crystal display (LCD), plasma, or other type of video display known in the art. In the illustrated embodiment, the gaming machine 100 is an “upright” version in which the display 112 is oriented vertically relative to a player. Alternatively, the gaming machine may be a “slant-top” version in which the display 112 is slanted at about a thirty-degree angle toward the player. Further, the gaming machine may be a “bar-top” version in which the display is mounted horizontally in a bar top or table top. Still further, the gaming machine may be housed in a wall mounted or other vertically mounted cabinet.

The gaming machine 100 includes a plurality of possible credit receiving mechanisms 114 for receiving credits to be used for placing wagers in the game. The credit receiving mechanisms 114 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 100 includes a user interface comprising a plurality of push-buttons 116, and other possible devices. The plurality of push-buttons 116 may, for example, include one or more “bet” buttons for wagering, a “play” button for commencing play, a “collect” button for cashing out, a help” button for viewing a help screen, a “pay table” button for viewing the pay table(s), and a “call attendant” button for calling an attendant. Additional game specific buttons may be provided to facilitate play of the specific game executed on the machine. A touch screen overlaying video display 112 may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

In some embodiments, gaming machine 100 includes a top box 140. Top box 140 may contain a video display, a mechanical display, or a diorama display that supplements display 112. For example, the display in top box 140 may be a wheel such as a rotating wheel, mechanical dice, a board for a board game, or other such display.

A processor controls operation of the gaming machine 100. In response to receiving a wager and a command to initiate play, the processor randomly selects a game outcome from a plurality of possible outcomes and causes the display 112 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

Gaming machine 100 may include a player tracking card reader 124. A player may be enrolled in the gaming establishment’s player club and may be awarded certain complimentary offers as that player collects points on his player tracking account. The player inserts the player-tracking card into the reader, allowing the gaming establishment’s player tracking server to record the player’s wagering activity. The gaming machine 100 may also include a player tracking display 127 to be used with the player-tracking card and card reader 124.

In some embodiments, gaming machine 100 may include signage 120. Signage 120 may be a display device capable of displaying advertising, gaming information (e.g. type of game, denomination of game etc.) or other information to a player or potential player.

Figure 2:
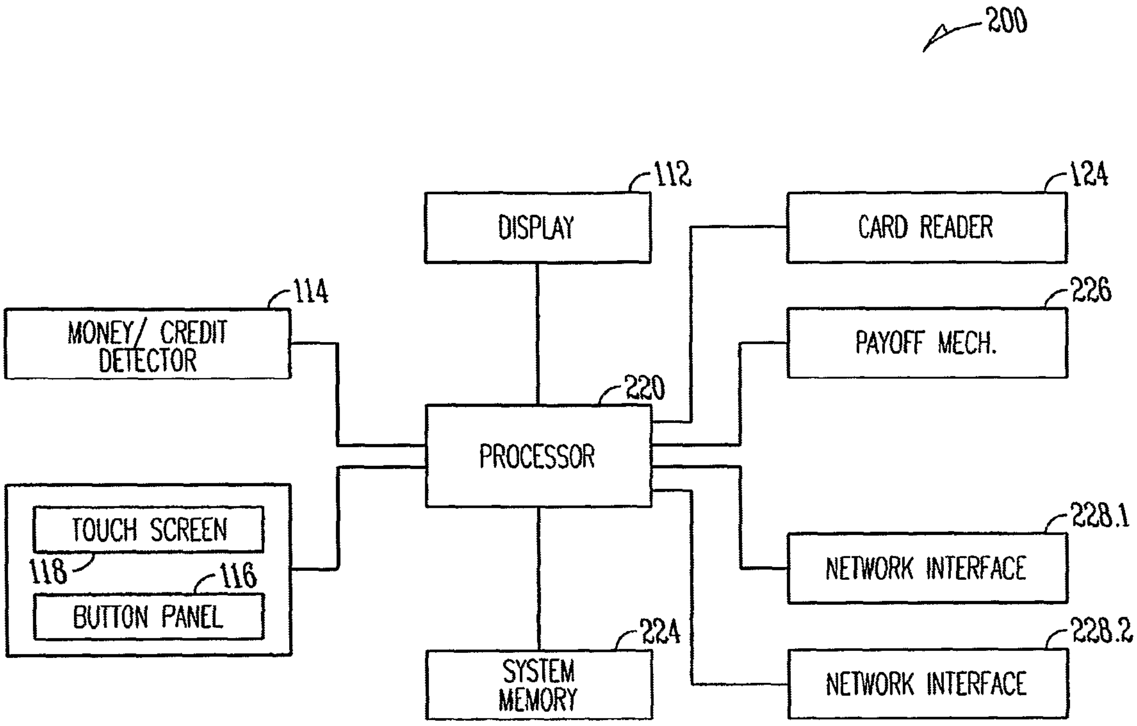
FIG. 2 is a block diagram of processing components of a gaming machine according to an example embodiment.

FIG. 2 is a block diagram of a control system 200 suitable for operating the gaming machine 100. Money/credit detector 114 signals a processor 220 when a player has inserted money, tickets, tokens, cards or other mechanism for obtaining credits for plays on the gaming machine through credit mechanisms 114. Using a button panel 116 and/or a touch screen 118, the player may select any variables associated with the wagering game and place his/her wager to purchase a play of the game. In a play of the game, the processor 220 generates at least one random event using a random number generator (RNG) and provides an award to the player for a winning outcome of the random event. Alternatively, the random event may be generated by a remote computer using an RNG or pooling schema and then transmitted to the gaming machine. The processor 220 operates the display 112 to represent the random event(s) and outcome(s) in a visual form that can be understood by the player. In addition to the processor 220, the control system may include one or more additional slave control units for operating the display 112 and any secondary displays.

System memory 224 stores control software, operational instructions and data associated with the gaming machine. In some embodiments, the system memory 224 comprises a separate read-only memory (ROM) and battery-backed random-access memory (RAM). However, it will be appreciated that the system memory 224 may be implemented on any of several alternative types of memory structures or may be implemented on a single memory structure. For example, memory 224 may comprise multiple banks of memory, including RAM, compact flash, hard drives, CD-ROM drives, DVD-ROM drives and combinations thereof.

A payoff mechanism 226 is operable in response to instructions from the processor 220 to award a payoff to the player. The payoff may, for example, be in the form of a number of credits. The number of credits is determined by one or more math tables stored in the system memory 224. As noted above with respect to FIG. 1, the payoff mechanism may be a coin hopper, a ticket printer, a magnetic card writer, or a database update mechanism that updates a database maintaining account information.

Network interface 228 operates to communicably couple system 200 in gaming machine 100 to a network. The network may be any type of wired or wireless network and the network interface 228 may vary based on the type of network. In some embodiments, the network comprises a gaming establishment network such as a LAN (local area network). In alternative embodiments, the network may be an intranet linking multiple networks, for example, the networks of a gaming enterprise that operates multiple gaming establishments. In further alternative embodiments, the network may comprise the Internet. Additionally, gaming machine 100 may have a single network interface 228 or more than one network interface 228 (e.g. network interfaces 228.1 and 228.2). In those embodiments having multiple network interfaces, the network interfaces may provide a redundant interface to a single network, or the network interfaces may be coupled to independent networks. In the case of independent networks, the networks may be of the same type or the networks may be of differing types (e.g. a wired and a wireless network).

Figure 3:
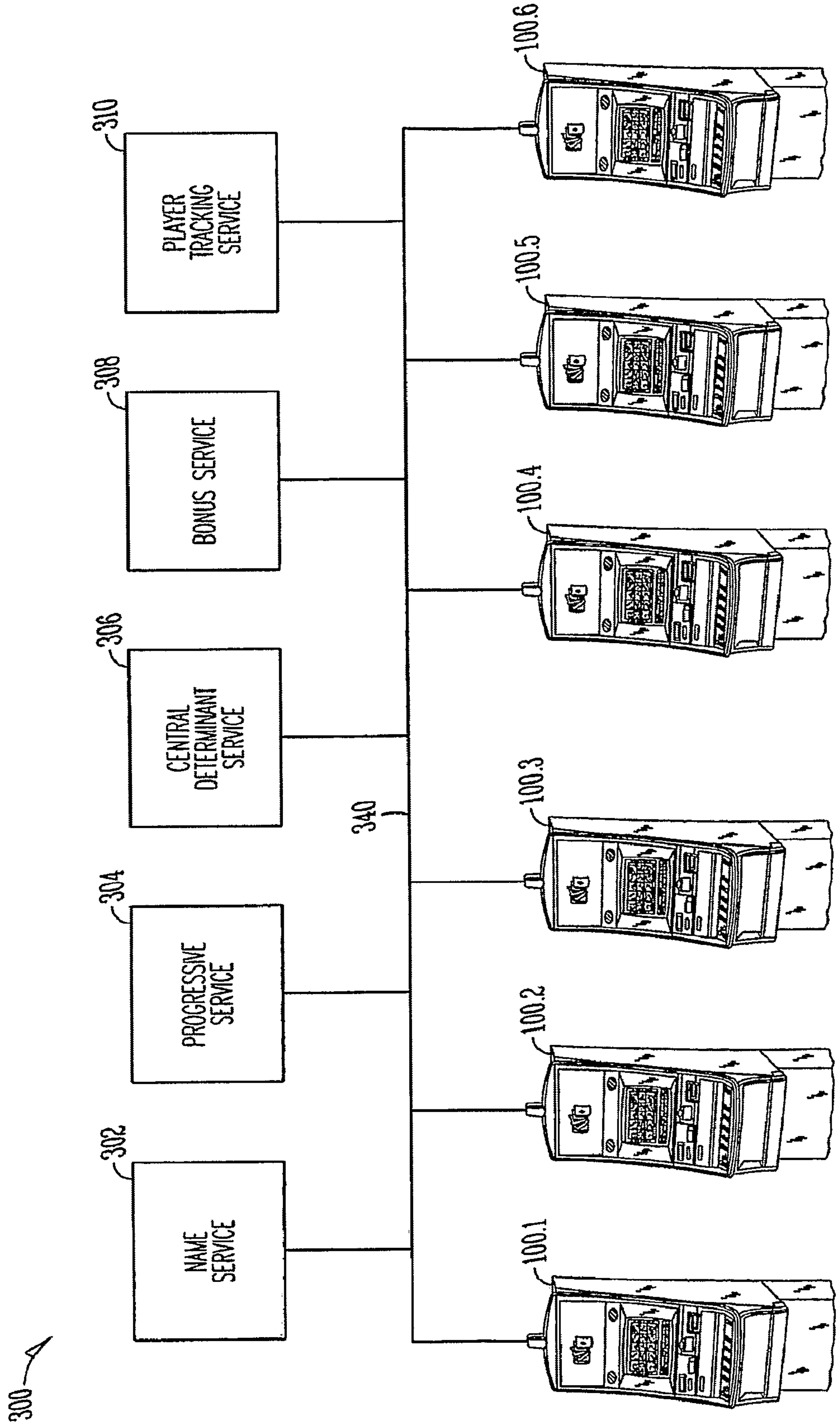
FIG. 3 is a block diagram of major components of a gaming system of services and gaming machines according to an example embodiment.

FIG. 3 is a block diagram of major components of a gaming system 300 of services and gaming machines according to an example embodiment. In some embodiments, gaming system 300 includes one or more gaming 100 and various combinations of services 302-310, all communicably coupled via network 340. Network 340 may be a wired or wireless network, or a combination of wired and wireless networks. In some embodiments, network 340 is a gaming establishment local area network. In alternative embodiments, network 340 may be a network that links multiple gaming establishments or facilities. In further alternative embodiments, network 340 may include the Internet.

As noted above, various services may be provided on network 340. Examples of such services include name service 302, progressive service 304, central determinant service 306, bonus service 308 and player tracking service 310. Those of skill in the art will appreciate that other services may now exist or be developed in the future, and that such services are within the scope of the inventive subject matter. Various combinations of the aforementioned services may be located on the same server, all of the services may be located on a single server, or the services may each be located on their own server. The embodiments of the invention are not limited to any particular service/server configuration.

Name service 302 provides a well known location for gaming machine applications and other services to send queries for the network address of services available on gaming network 340. Name service responds to queries with the network address bound to the named service.

Progressive service 304 manages one or more progressive wagering game in which multiple gaming machines 100 contribute to a pool of potential winnings that may be paid out to any gaming machine participating in the progressive wagering game upon certain outcomes.

Central determinant service 306 provides a centralized game outcome provider. The central determinant service executes a random number generator (RNG) that is used to determine the outcome for a wagering game or bonus round on behalf of the gaming application invoking the service.

Bonus service 308 provides bonus round data (outcomes, video, audio etc.) for a gaming application invoking the service.

Player tracking service 310 gathers and maintains data regarding a player on a gaming machine. A player inserts a player tracking card or other identification device into the gaming machine. The gaming machine can then obtain player preferences from the player tracking service and also communicate game related data to the player tracking service (e.g. game outcomes, amounts wagered, credits won/lost etc.).

Figure 4A:
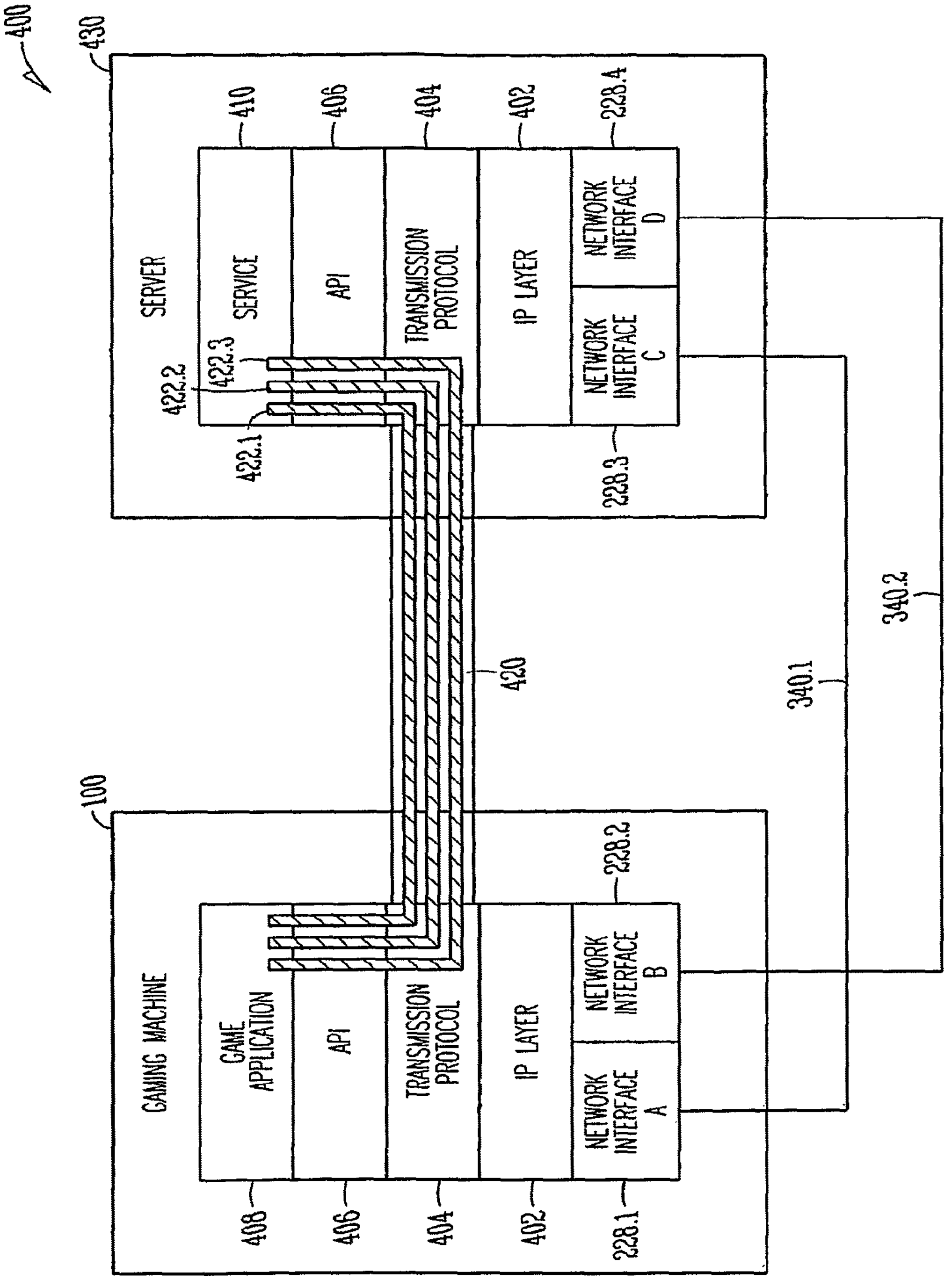
FIGS. 4A-4C are a block diagrams providing further details of a network of gaming machines and services according to an example embodiment.

FIG. 4A is a block diagram providing details of a network communication system for a gaming application 408 on gaming machine 100 and a service 410 on a server 430 according to an example embodiment. Gaming application 408 may be any type of gaming application executable on a gaming machine 100. Service 410 may be any type of service provided on a gaming network 340, including, but not limited to, services 302-310 described above.

Gaming application 408 and service 410 each utilize a network stack to communicate data through network 340. In some embodiments, network stack comprises network interface 228, IP layer 402, transmission protocol layer 404, and API (Application Program Interface) 406.

Network interface 228 provides a hardware and software interface to a physical network 340. Network interface 228 will vary depending on the type of network. In addition, network interface 228 includes device driver software that may be called by the IP layer 402 (or an intermediate MAC layer) in order to send and receive network data.

IP layer 402 implements the Internet Protocol, which provides a packet format and a common addressing scheme that is used to identify a particular machine or device on a network that will receive the packet.

Transmission protocol layer 404 provides connection oriented network services for applications and services that are configured to communicate with one another. Transmission protocol layer 404 defines a protocol data unit (also referred to as a packet) that includes header data used to provide connection oriented data communication via a communication association 420 and communication streams 422. In some embodiments, transmission protocol layer 404 provides the following capabilities:

- Reliable transmission of data, including detection that data has been lost (e.g. data lost may be retransmitted)
- Connection oriented transmission (e.g. data is delivered to an identified recipient on a remote machine through an established connection)
- Message framing (e.g. data may be delivered in units of a message that comprises multiple byte quantities, with message boundaries preserved). Messages may also be referred to as datagrams.
- Message prioritization
- Ordered and unordered message delivery
- Support for multiple streams of messages
- Support for multi-homing
- A Four-way handshake to initiate an association (connection) to defend against denial-of-service attempts caused by bombarding nodes with fake connection requests.
- Protocol mechanisms to implement a graceful shutdown to prevent half-open associations.
- Validation and acknowledgment mechanisms to aid in protecting against flooding attacks and to provide notification of duplicated or missing data chunks.

In some embodiments, transmission protocol layer 404 conforms to the SCTP (Stream Control Transmission Protocol).

API 406 provides an interface to the transmission protocol layer for applications 408 and services 410. In some embodiments, the API is a socket based API as is known in the art.

In operation, a game application may establish a connection with a service 410 by creating a communication association 420 and one or more communication streams 422 within communication association 420. Communication association 420 establishes a logical data connection between two endpoint machines, in this example gaming machine 100 and server 430. The communication association may specify a single IP address, which in turn is associated with a single network interface 228.

However, in some embodiments, the communication association may be multi-homed. In these embodiments, a communication association may specify multiple IP addresses (each assigned to a separate network interface 228), each of which may be used to send and receive data for the communication association. A multi-homed association is desirable, because it provide fault tolerance to the connection. For example, if the communication association is multi-homed through IP addresses associated with network interfaces 228.1 and 228.2, network interface 228.1 fails, data may still be communicated over the other network interface 228.2 using the IP address associated with network interface 228.2. Similarly if the network interfaces 228.1 and 228.2 are associated with separate networks 340.1 and 340.2 respectively, then a failure anywhere along network 340.1 may be detected and data transmitted over network 340.2 using the IP address associated with network interface 228.2.

In some embodiments, one of the multiple IP addresses in a multi-homed communication association may be designated as the primary IP address, which will handle all data communication in the absence of a failure.

In some embodiments, a failure in an association is detected using heartbeat messages. A heartbeat message may be transmitted through an IP address assigned to an communication association. If the heartbeat message is not acknowledged, transmission protocol layer 404 may determine that the network interface associated with the IP address has failed. Transmission protocol layer 404 may then communicate data over a different IP address assigned to the communications association. In some embodiments, the switching of network interfaces caused by selecting a different IP address assigned to the communications association may occur without the intervention or knowledge of the gaming application or gaming service.

It should be noted that although FIG. 4A shows one communications association between application 408 and service 410, there may be multiple communications associations between an application and a service. Additionally, there may be multiple associations between a game application 408 and multiple services on different servers.

Communication streams 422 are separate and uniquely identified message delivery channels within a communication association 420, and provide connection oriented data communication between a game application and a game service (or between two game service or between two game applications). In some embodiments, the streams are unidirectional. In these embodiments, the number of streams in a communication association between a source and destination may be different in each direction. In the example illustrated in FIG. 4A, three communication streams 422.1-422.3 have been established. However, one, two or more than three communication streams may be used. The embodiments of the invention are not limited to any particular number of communication streams.

Each communication stream may have a separate priority, where messages in higher priority communication streams are processed before messages in lower priority communication streams. The prioritization mechanism may be used in system 400. For example, a progressive service may communicate data with a gaming application participating in the progressive service using multiple streams, a first stream to communicate the progressive amounts to the progressive server for addition to the progressive pool and a second stream used to communicate display information regarding the progressive game to the participating gaming application. In order to insure the integrity of the progressive pool, it may be desirable to place a higher priority on messages related to updating the pool and a lower priority on messages used to deliver data for display purposes.

Figure 4B:
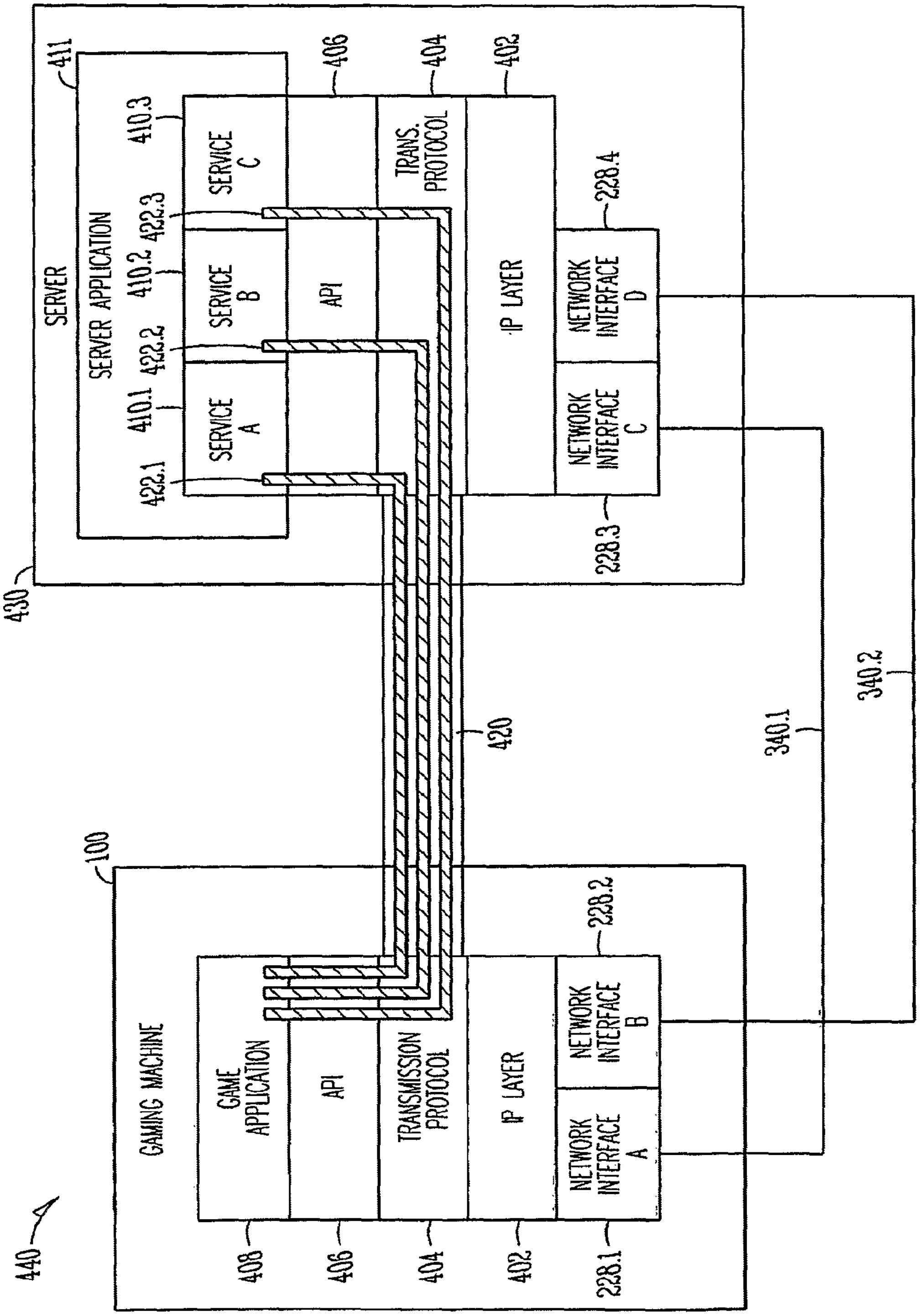

FIG. 4B is a block diagram providing details of a network communication system for a gaming machine and multiple services according to an example embodiment. In FIG. 4B, an example system configuration 440 is illustrated where gaming application 408 may use a communication association 420 and multiple communication streams 422 to communicate with multiple services 410.1, 410.2 and 410.3. In some embodiments, the multiple services are provided in the context of a single server application 411. For example, services 410.1, 410.2 and 410.3 may be threads that run in the context of their parent application 411. For example, services 410.1, 410.2 and 410.3 may comprise a name service 302, a bonus service 308, and a player tracking service 310 respectively. Again, communications streams may be prioritized, with communication stream 422.1 being a relatively low priority while communication stream 422.2 being a relatively high priority in order to allow a bonus round to be played in real time.

Figure 4C:
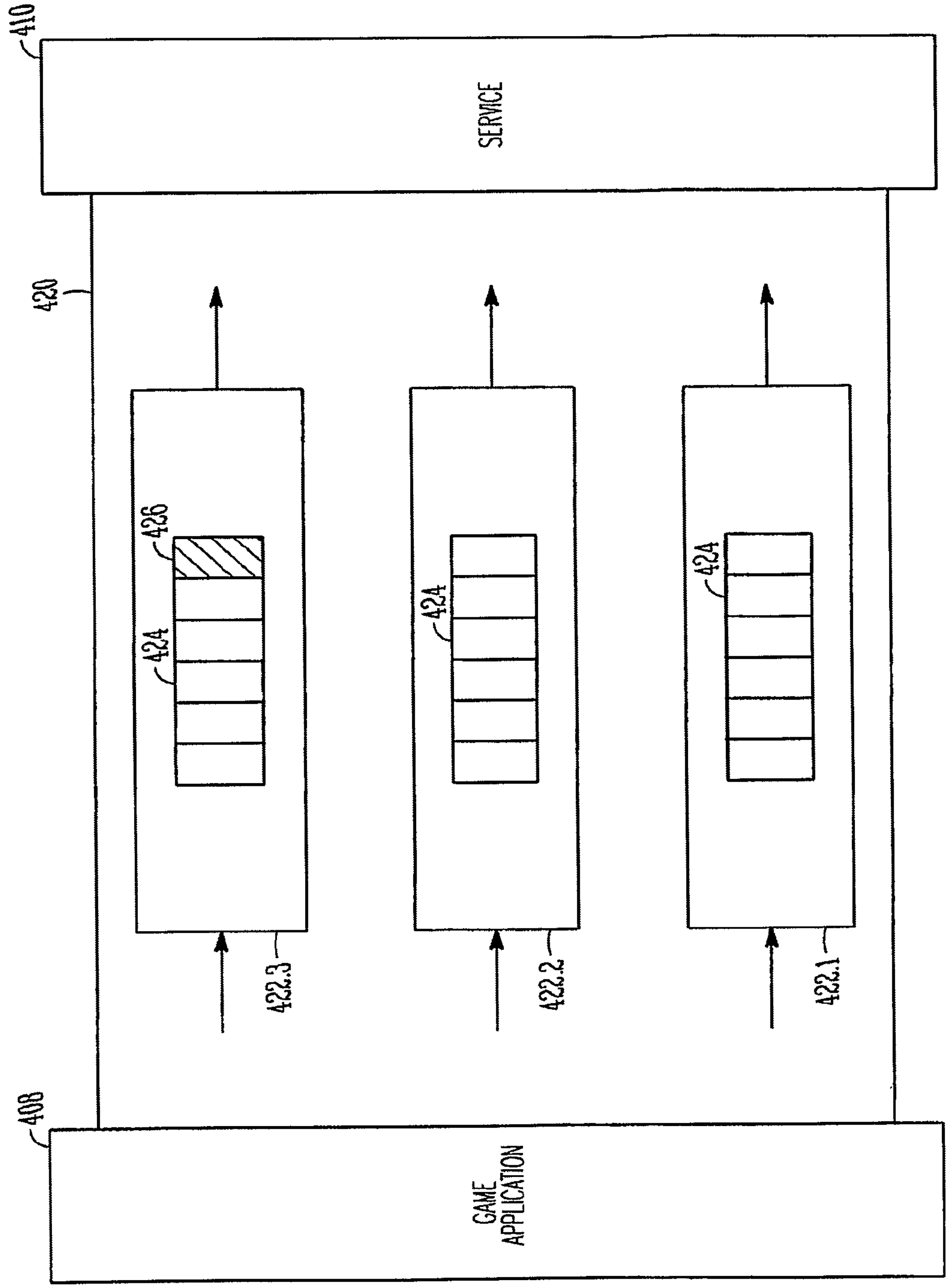

FIG. 4C is a block diagram providing details of multiple communication streams between a gaming machine and a service according to an example embodiment. In the example shown, messages 424 in communication streams 422.1, 422.2 and 422.3 are sent from game application 408 to service 410. As noted above, the streams may have differing priorities. Assume that one message, message 426 has been lost due to a network failure. Later delivery of messages in stream 422.3 may be delayed while the system attempts to recover message 426. However, delivery of messages 424 in streams 422.1 and 422.2 may continue unaffected by the lost message. In this way, the head of queue problem may be avoided.

Figure 5:
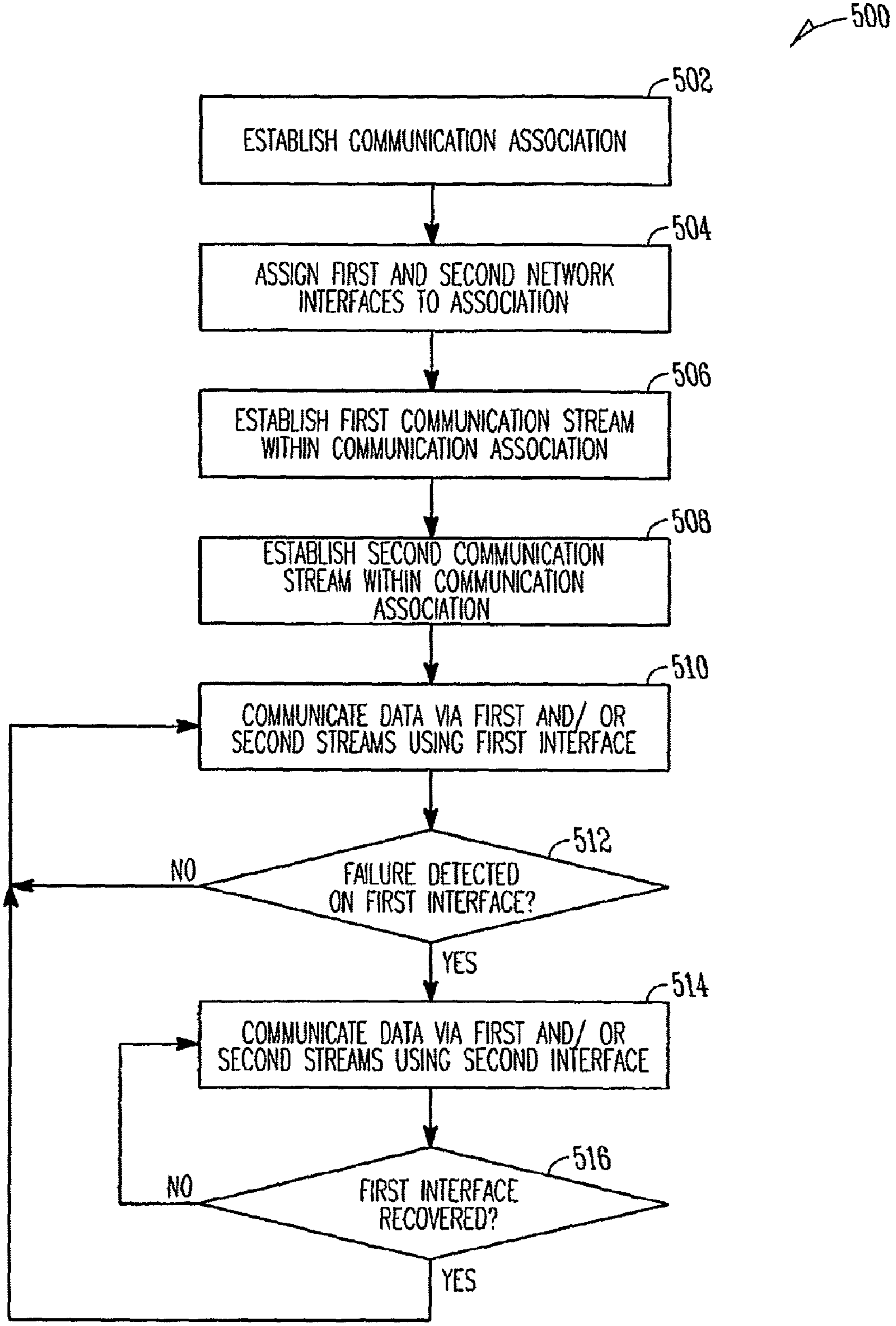
FIG. 5 is a flowchart illustrating a method for using a transmission protocol in a gaming system.

FIG. 5 is a flowchart illustrating methods 500 for using a transmission protocol in a gaming system. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 5 are inclusive of acts that may be taken by an operating environment executing an exemplary embodiment of the invention.

The method begins by establishing a communication association between two gaming system endpoints (block 502). For example, a communication association may be established between a gaming application client and a gaming server providing gaming related services.

Next, in some embodiments, one or more network interfaces are assigned to the communication association (block 504). The network interfaces may be coupled to a common network or the network interfaces may be coupled to different networks in order to provide redundant paths between the gaming system endpoints. In the case of multiple network interfaces being assigned to a communication association, one of the network interfaces may be designated as a primary interface for the communication association.

Next, a first communication stream within the communication association is established with a service (block 506). In some embodiments a second communication stream within the communication association may be established (block 508). Once established, data may be sent or received over the first and/or second streams (block 510). The first and second communication streams may be assigned differing priorities in order to allow high priority data to be sent or received via one stream while lower priority (presumably less important) data is sent or received over the second communication stream.

Periodically, a failure may be detected on an interface (block 512). In some embodiments, the failure may be detected when a response to a heartbeat message sent over the interface is not received. In alternative embodiments, the failure may be detected when messages sent via an interface are not acknowledged by the recipient.

In the absence of failure, messages may continue to be sent over the streams using the first interface (block 510). However, when a failure is detected, the system switches to sending messages via a second interface (block 514).

Periodically the system may check to determine if the first interface has recovered (block 516), for example by sending a heartbeat message and receiving a response indicating acknowledging the heartbeat message. If a recovery is not detected, the system continues to use the second interface to communicate messages (unless it too fails, in which case a third interface may be used if available). If the first interface has recovered, the system may resume using it to send or receive messages (block 510).

CONCLUSION

Systems and methods for using a transmission protocol such as SCTP in a gaming network have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method for gaming systems to communicate in a gaming network, the method comprising:

establishing a communication association between a first gaming system operable to present a gaming application on which monetary value can be wagered and a second gaming system providing a first and second gaming service, wherein the communication association is a logical data connection between the first gaming system and the second gaming system, and operable to carry a plurality of communications streams within the communication association, each communication stream being a separate and uniquely identifiable message delivery channel within the communication association;

establishing a first communication stream between the gaming application and the first gaming service, the first communication stream being established within the communication association, and the first communication stream having a first priority;

establishing a second communication stream between the gaming application and the second gaming service, the second communication stream being established within the communication association, and the second communication stream having a second priority, the second priority higher than the first priority; and transmitting data over the first communication stream.

2. The method of claim 1, wherein the second communication stream continues to provide data although the first communications stream ceases to provide data.

3. The method of claim 1, further comprising associating a first network interface and a second network interface with the communication association.

4. The method of claim 3, wherein the first network interface is communicably coupled to a first network and the second network interface is communicably coupled to a second network.

5. The method of claim 3, further comprising designating the first network interface as a primary interface.

6. The method of claim 2, further comprising determining a communication failure associated with the first network interface.

7. The method of claim 6, wherein determining a communication failure comprises a failure to receive a response to a heartbeat message.

8. The method of claim 6, wherein determining a communication failure comprises a failure to receive an acknowledgment to data sent through the first network interface.

9. The method of claim 6, further comprising sending and receiving data over the second network interface.

10. A gaming system comprising:

a first gaming system and a second gaming system, the first gaming system having one or more network interfaces and the second gaming system having one or more network interfaces;

a transmission protocol executable on each of the first gaming system and the second gaming system, said transmission protocol operable to communicate data via the one or more network interfaces on the first gaming system and the second gaming system; and a gaming application executable by the first gaming system and operable to present a wagering game on which monetary value may be wagered and further operable to use the transmission protocol to establish a communications association with the second gaming system, wherein the communication association is a logical data connection between the first gaming system and the second gaming system, and further wherein at least one of the one or more network interfaces are assigned to the communication association, and further wherein the communication association is operable to carry a plurality of communications streams within the communication association, each communication stream being a separate and uniquely identifiable message delivery channel within the communication association, and at least two of the plurality of communications streams having assigned priorities to prioritize communication with respect to the at least two of the plurality streams.

11. The gaming system of claim 10, wherein the gaming application is further operable to establish at least one communication stream with a service executable on the second gaming system.

12. The gaming system of claim 10, wherein a first network interface of the one or more network interfaces is communicably coupled to a first network and a second network interface of the one or more network interfaces is communicably coupled to a second network.

13. The gaming system of claim 12, wherein upon detecting a failure in communicating messages over the first network interface, the transmission protocol causes messages to be communicated over the second network interface without intervention of the gaming application.

14. A non-transitory computer-readable medium having computer executable instructions that when executed by one or more processors perform a method, the method comprising:

establishing a communication association between a first gaming system operable to present a gaming application on which monetary value can be wagered and a second gaming system providing a first and second gaming service, wherein the communication association is a logical data connection between the first gaming system and the second gaming system, and operable to carry a plurality of communications streams within the communication association, each communication stream being a separate and uniquely identifiable message delivery channel within the communication association;

establishing a first communication stream between the gaming application and the first gaming service, the first communication stream being established within the communication association, and the first communication stream having a first priority;

establishing a second communication stream between the gaming application and the second gaming service, the second communication stream being established within the communication association, and the second communication stream having a second priority, the second priority higher than the first priority; and transmitting data over the first communication stream.

15. The non-transitory computer-readable medium of claim 14, wherein the second communication stream continues to provide data although the first communications stream ceases to provide data.

16. The non-transitory computer-readable medium of claim 14, wherein the method further comprises associating a first network interface and a second network interface with the communication association.

17. The non-transitory computer-readable medium of claim 16, wherein the first network interface is communicably coupled to a first network and the second network interface is communicably coupled to a second network.

18. The non-transitory computer-readable medium of claim 16, wherein the method further comprises designating the first network interface as a primary interface.

19. The non-transitory computer-readable medium of claim 16, wherein the method further comprises determining a communication failure associated with the first network interface.

20. The non-transitory computer-readable medium of claim 19, wherein determining a communication failure comprises a failure to receive a response to a heartbeat message.

21. The non-transitory computer-readable medium of claim 19, wherein determining a communication failure comprises a failure to receive an acknowledgment to data sent through the first network interface.

22. The non-transitory computer-readable medium of claim 19, wherein the method further comprises sending and receiving data over the second network interface.

23. The method of claim 1, wherein the first communication stream is configured to communicate display information, and the second communication stream is configured to communicate progressive pool information, such that messages related to progressive pool information communicated in the second communication stream are given a higher priority than messages communicated in the first communication stream.

24. The method of claim 1, wherein the first gaming service is a name service and the second gaming service is a bonus service.

25. The method of claim 1, wherein the communication association is multi-homed.

26. The non-transitory computer-readable medium of claim 14, wherein the first communication stream is configured to communicate display information, and the second communication stream is configured to communicate progressive pool information, such that messages related to progressive pool information communicated in the second communication stream are given a higher priority than messages communicated in the first communication stream.

27. The non-transitory computer-readable medium of claim 14, wherein the first gaming service is a name service and the second gaming service is a bonus service.

28. The non-transitory computer-readable medium of claim 14, wherein the communication association is multi-homed.

* * * * *